US011990289B2

(12) United States Patent
Ding et al.

(10) Patent No.: US 11,990,289 B2
(45) Date of Patent: May 21, 2024

(54) LIGHT-EMITTING KEYBOARD MODULE WITH A METAL BASE MATERIAL FLEXIBLE COPPER-CLAD DOUBLE-SIDED CIRCUIT BOARD

(71) Applicant: Shenzhen Hui Chuang Da Technology Co., Ltd., Shenzhen (CN)

(72) Inventors: Jinxin Ding, Shenzhen (CN); Ming Li, Shenzhen (CN); Jie Feng, Shenzhen (CN); Meng Ding, Shenzhen (CN)

(73) Assignee: Shenzhen Hui Chuang Da Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/973,804

(22) Filed: Oct. 26, 2022

(65) Prior Publication Data

US 2023/0402237 A1 Dec. 14, 2023

(30) Foreign Application Priority Data

Jun. 13, 2022 (CN) ........................ 202210662239.X

(51) Int. Cl.
*H01H 13/02* (2006.01)
*H01H 13/14* (2006.01)
(Continued)

(52) U.S. Cl.
CPC .......... *H01H 13/023* (2013.01); *H01H 13/14* (2013.01); *H01H 13/20* (2013.01); *H01H 13/83* (2013.01)

(58) Field of Classification Search
CPC ...... H01H 13/023; H01H 13/14; H01H 13/20; H01H 13/83; H01H 2013/026; H01H 3/125; H01H 13/7065; H01H 13/702; H01H 13/703; H01H 13/704; H01H 13/705; H01H 2215/044; H01H 2219/014; H01H 2219/036; H01H 2219/03; H01H 3/12; H01H 13/70; H01H 2215/004; H01H 13/02
See application file for complete search history.

(56) References Cited

U.S. PATENT DOCUMENTS 8,242,938 B2 * 8/2012 Lin ...................... G02B 6/0021 341/22
10,410,807 B2 * 9/2019 Tsai ..................... G02B 6/0055
(Continued)

*Primary Examiner* — Lheiren Mae A Caroc
(74) *Attorney, Agent, or Firm* — Georgi Korobanov

(57) ABSTRACT

A light-emitting keyboard module with a metal base material flexible copper-clad double-sided circuit board, comprising a double-sided circuit board, a trigger layer, a light-guiding film, an elastic conducting member, an LED light and a keycap. The trigger layer is arranged on the double-sided circuit board, and conducting contacts are arranged under the trigger layer corresponding to a position of the double-sided circuit board. A conduction pressing point is arranged at a position corresponding to the conducting contact above the trigger layer, the LED light is arranged on the double-sided circuit board. The trigger layer is provided with a first through hole, the light-guiding film is arranged above the trigger layer, the light-guiding film is provided with a second through hole. The light-guiding film is provided with a third through hole, an elastic conducting member is arranged at a position corresponding to the third through hole.double-sided.

12 Claims, 4 Drawing Sheets

(51) Int. Cl.
*H01H 13/20* (2006.01)
*H01H 13/83* (2006.01)

(56) References Cited

U.S. PATENT DOCUMENTS

2023/0116154 A1* 4/2023 Ding .................... G02B 6/0088
362/23.03
2023/0141940 A1* 5/2023 Ding ...................... H01H 13/14
200/310

* cited by examiner

LIGHT-EMITTING KEYBOARD MODULE WITH A METAL BASE MATERIAL FLEXIBLE COPPER-CLAD DOUBLE-SIDED CIRCUIT BOARD

TECHNICAL FIELD

The present application relates to a light-emitting keyboard module, in particular to a light-emitting keyboard module with a metal base material flexible copper-clad double-sided circuit board, which is applied to the technical field of computer peripheral equipment.

BACKGROUND

The keyboard is the most commonly used and the most important input device. Through the keyboard, English letters, Chinese characters, numbers, punctuation marks, etc. can be input into the computer, so as to send commands and input data to the computer. It can be said that since the advent of the computer, the keyboard has been one of the indispensable peripherals of the computer.

With the continuous development of the keyboard, in order to make the keyboard have a better use effect and meet the different needs of more users, the illuminated keyboard came into being. The keycap is designed as a light-transmitting structure, using the light emitted by the backlight module to illuminate the keycap, which is more suitable for input at night, making it easy to see the words on the keycap, and on the other hand, it will also produce more cool Effect. Some of the existing light-emitting keyboard modules use single-sided circuit boards. However, the existing single-sided circuit boards can no longer meet the functional requirements of the luminous keyboard. Therefore, some others adopt double-sided circuit boards. However, during the use of the existing light-emitting keyboard using double-sided circuit boards, there is a problem that the light-emitting keyboard module is easily bent and damaged after long-term use, which affects the user experience, which reduces the product life cycle.

SUMMARY OF THE APPLICATION

In view of the above-mentioned problem that some of the light-emitting keyboards in the prior art adopt double-sided circuit boards, the light-emitting keyboard module is easily bent and damaged after long-term use, which affects the service cycle of the product, the present application provides a metal base material flexible copper-clad double-sided circuit board. By using a double-sided circuit board with a support structure, during the use of the light-emitting keyboard, the support by the support structure effectively enhances the structural stability of the light-emitting keyboard module, and ensures the stability of the entire light-emitting keyboard module in use.

The technical solution adopted by the present application to solve its technical problems is: a light-emitting keyboard module with a metal base material flexible copper-clad double-sided circuit board, comprising a double-sided circuit board, a trigger layer, a light-guiding film, an elastic conducting member, an LED light and a keycap, wherein the trigger layer is arranged on the double-sided circuit board, and conducting contacts are arranged under the trigger layer corresponding to a position of the double-sided circuit hoard, a conduction pressing point is arranged at a position corresponding to the conducting contact above the trigger layer, the LED light is arranged on the double-sided circuit board and is arranged corresponding to the keycap, the trigger layer is provided with a first through hole at a position corresponding to the LED light, the light-guiding film is arranged above the trigger layer, the light-guiding film is provided with a second through hole at a position corresponding to the first through hole, and the LET) light is arranged inside the first through hole and the second through hole, the light-guiding film is provided with a third through hole at a position corresponding to the conduction pressing point, the elastic conducting member is arranged at a position corresponding to the third through hole, and the keycap is arranged above the elastic conducting member.

Furthermore, the double-sided circuit board comprises a support structure, a first insulating layer, a first circuit layer, a second insulating layer and a second circuit layer, wherein the first insulating layer is arranged on the support structure, the first circuit layer is arranged on the first insulating layer, and the second insulating layer is arranged on the first circuit layer, a fourth through hole is provided on the second insulating layer at a position corresponding to the first circuit layer, and the second circuit layer is arranged on the second insulating layer, the second circuit layer is connected to the first circuit layer through a fourth through hole.

Furthermore, an extending portion is provided on the second circuit layer at a position corresponding to the fourth through hole and the extending portion is placed inside the fourth through hole and is connected with the first circuit board.

Furthermore, the circuit board further comprises a protective layer, the protective layer is arranged on the second circuit layer, and a fifth through hole is provided on the protective layer at a position corresponding to the fourth through hole, and the extending portion is placed inside the fifth through hole.

Furthermore, the first insulating layer is fixed with the first circuit layer by using a first adhesive layer, and the thickness of the first insulating layer is 0.02 mm-0.05 mm; the second insulating layer is fixed with the first circuit layer by using a second adhesive layer, and the thickness of the second insulating layer is 0.02 mm-0.05 mm.

Furthermore, a composite film is arranged above the light-guiding film, the thickness of the composite film is 0.020-0.30 mm, a lower layer of the composite film is provided with white ink, and an upper layer of the composite film is provided with black ink, wherein the composite film is not provided with white ink and black ink at a position corresponding to the keycap, or the composite film is provided with an opening at the position corresponding to the keycap.

Furthermore, the supporting structure is a steel sheet, and the thickness of the steel sheet is 0.10 mm-0.25 mm.

Furthermore, the conduction pressing point is a silver paste dot or carbon paste dot.

Furthermore, the elastic conducting member is an elastic sheet, and the elastic sheet is arranged on the trigger layer; or the elastic sheet is arranged on the light-guiding film; the elastic sheet is arranged on the composite film.

Furthermore, a scissor foot is arranged between the keycap and the elastic conducting member, wherein the keycap and the scissor foot are respectively arranged on the support structure.

The beneficial effects of the present application are: the present application provides a light-emitting keyboard module with a metal base material flexible copper-clad double-sided circuit board. By using a double-sided circuit board with a support structure, during the use of the light-emitting keyboard, the support by the support structure effectively enhances the structural stability of the light-emitting keyboard module, and ensures the stability of the entire light-emitting keyboard module in use.

REFERENCE SIGNS

1—Support structure, 2—First insulating layer, 3—First adhesive layer, 4—First circuit layer, 5—Second adhesive layer, 6—Second insulating layer, 61—Fourth through hole, 7—Second circuit layer, 71— Extending portion, 8— Protective layer, 81— Fifth through hole, 9—Trigger layer, 91— Conduction pressing point, 92— First through hole, 93—Conducting contact, 10—Light-guiding film, 101— Second through hole, 102—Third through hole, 11—Composite film, 1101—Upper layer, 1102—Lower layer, 1103— Opening, 12—Scissor foot, 13—Keycap, 14—Elastic sheet, 15—LED light

DETAILED DESCRIPTION

In order to make the objectives, technical solutions and effects of the present application clearer, the present application will be further described in detail below with reference to the accompanying drawings and examples. It should be understood that the specific embodiments described herein are only used to explain the present application, but not to limit the present application.

Figure 1:
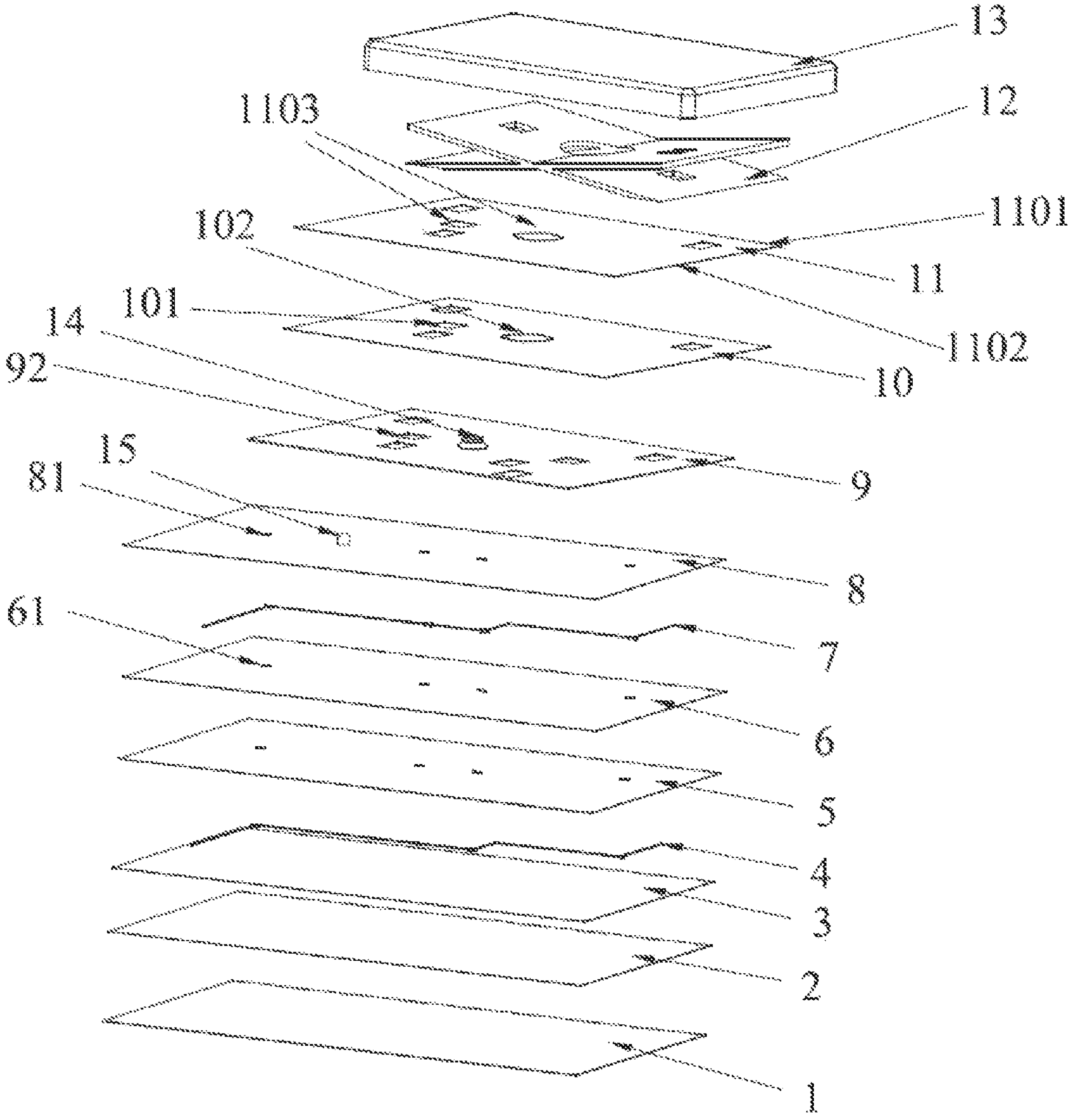
FIG. 1 is a schematic diagram of the exploded structure of the light-emitting keyboard module with a metal base material flexible copper-clad double-sided circuit board provided by the present application.
Figure 2:
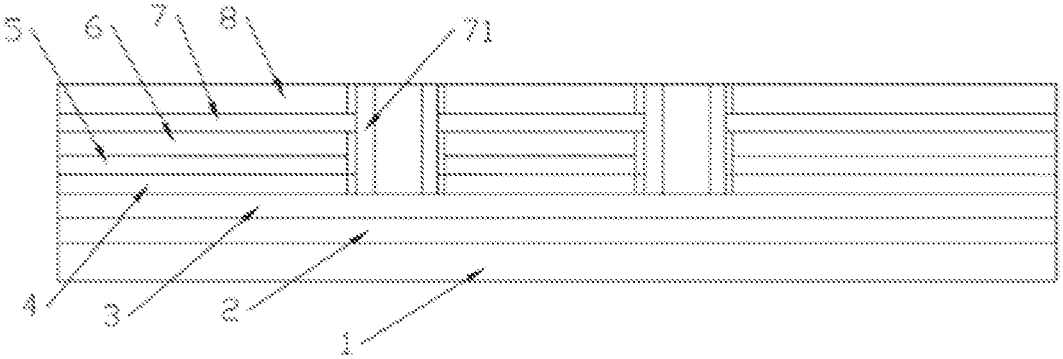
FIG. 2 is a schematic cross-sectional structure diagram of a double-sided circuit board provided by the present application.
Figure 3:
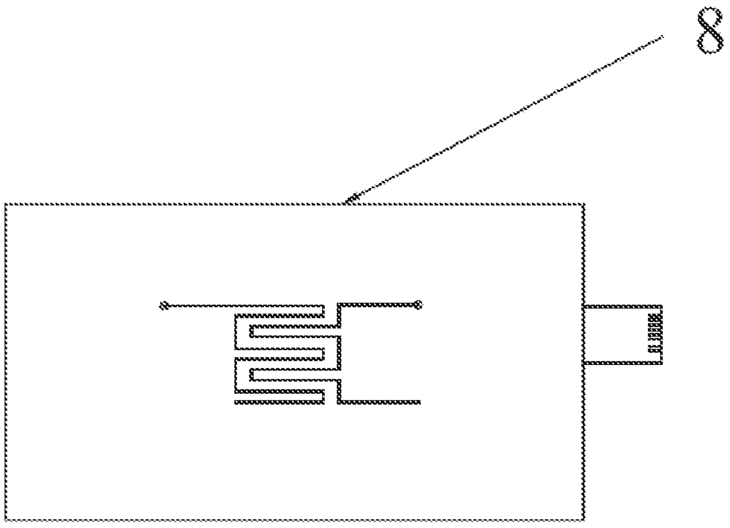
FIG. 3 is a top view structural schematic diagram of the trigger layer provided by the present application.
Figure 4:
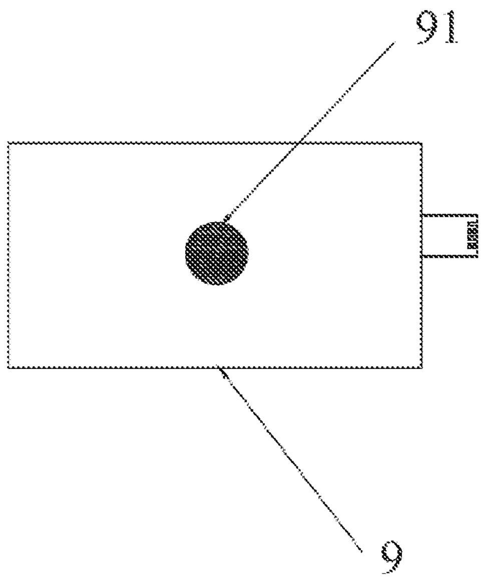
FIG. 4 is a top view structural schematic diagram of the double-sided circuit board provided by the present application.
Figure 5:
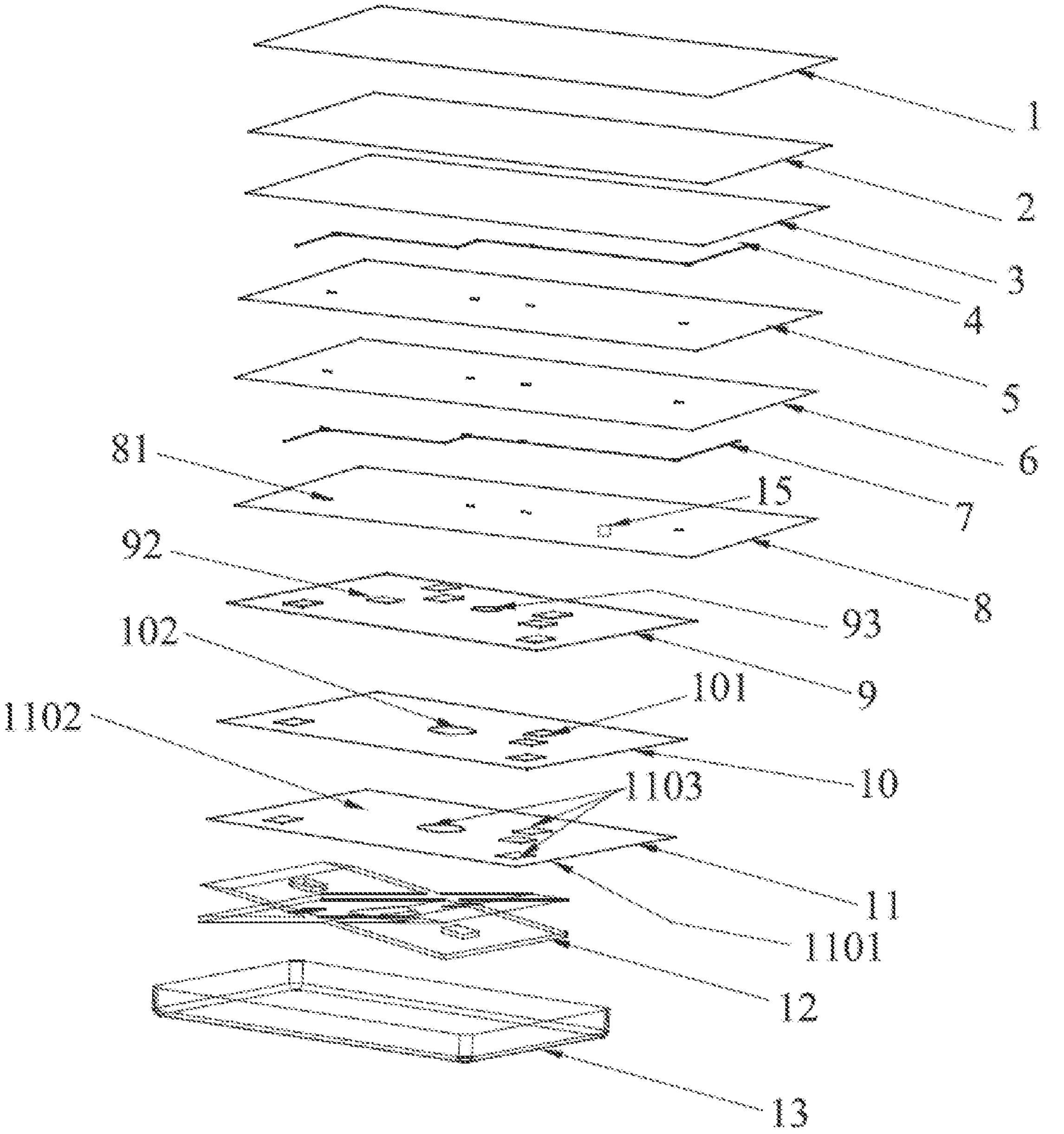
FIG. 5 is another schematic diagram of the exploded structure of the light-emitting keyboard module with a metal base material flexible copper-clad double-sided circuit board provided by the present application.

Please refer to accompanying FIGS. 1 to 5. The present application provides a light-emitting keyboard module with a metal base material flexible copper-clad double-sided circuit board, comprising a double-sided circuit board, a trigger layer 9, a light-guiding film 10, an elastic conducting member, an LED light 15 and a keycap 13, wherein the trigger layer 9 is arranged on the double-sided circuit board, and conducting contacts 93 are arranged under the trigger layer 9 corresponding to a position of the double-sided circuit board, a conduction pressing point 91 is arranged at a position corresponding to the conducting contact 93 above the trigger layer 9, wherein the conduction pressing point 91 is a silver paste dot or carbon paste dot. The LED light 15 is arranged on the double-sided circuit board and is arranged corresponding to the keycap 13, the trigger layer 9 is provided with a first through hole 92 at a position corresponding to the LED light 15, the light-guiding film 10 is arranged above the trigger layer 9, the light-guiding film 10 is provided with a second through hole 101 at a position corresponding to the first through hole 92, and the LED light 15 is arranged inside the first through hole 92 and the second through hole 101, so that the light emitted by the LED light 15 could illuminate the keycap 13. The light-guiding film 10 is provided with a third through hole 102 at a position corresponding to the conduction pressing point 91, the elastic conducting member is arranged at a position corresponding to the third through hole 102, and the keycap 13 is arranged above the elastic conducting member. In a specific implementation, components such as the keycap 13 and the scissor foot 12 are arranged above the double-sided circuit board. When in use, the support by the double-sided circuit board effectively enhances the structural stability of the light-emitting keyboard module, and ensures the stability of the entire light emitting keyboard in use.

In this embodiment, in order to ensure the structural stability of the double-sided circuit board, the double-sided circuit board comprises a support structure 1, a first insulating layer 2, a first circuit layer 4, a second insulating layer 6 and a second circuit layer 7, wherein the first insulating layer 2 is arranged on the support structure 1, the first circuit layer 4 is arranged on the first insulating layer 2, and the second insulating layer 6 is arranged on the first circuit layer 4, a fourth through hole 61 is provided on the second insulating layer 6 at a position corresponding to the first circuit layer 4, and the second circuit layer 7 is arranged on the second insulating layer 6, the second circuit layer 7 is connected to the first circuit layer 4 through a fourth through hole 61. By using the support structure 1, the overall stability of the double-sided circuit board is effectively increased, and the service life of the existing light-emitting keyboard is also increased. In this embodiment, the thicknesses of the first circuit layer 4 and the second circuit layer 7 are respectively 0.05-0.12 mm, which can not only ensure the normal use of electronic devices, but also effectively control the thickness of the double-sided circuit board, making the double-sided circuit board lighter and thinner. In this embodiment, the first circuit layer 4 and the second circuit layer 7 are copper foil circuits, which can be formed by etching, silk screen printing, or pasting.

In this embodiment, an extending portion 71 is provided on the second circuit layer 7 at a position corresponding to the fourth through hole 61, and the extending portion 71 is placed inside the fourth through hole 61 and is connected with the first circuit board. The extension portion 71 is preferably a copper block formed by the electroless copper plating method for the second circuit layer 7, and conducts the first circuit layer and the second circuit layer.

In this embodiment, in order to prevent short circuit and avoid oxidation and corrosion of the second circuit board 7, the circuit board further comprises a protective layer 8. The protective layer 8 is designed as polyimide film or polyester film. The protective layer 8 is arranged on the second circuit layer 7, and a fifth through hole 81 is provided on the protective layer 8 at a position corresponding to the fourth through hole 61, and the extending portion 71 is placed inside the fifth through hole 81. By using the fifth through hole 81, the normal use of the double-sided circuit board is not affected. In this embodiment, the thickness of the protective layer 8 is 0.01 mm-0.04 mm, preferably 0.02 mm.

In this embodiment, the first insulating layer 2 is fixed with the first circuit layer 4 by using a first adhesive layer 3; the second insulating layer 6 is fixed with the first circuit layer 4 by using a second adhesive layer 5. The first adhesive layer 3 and the second adhesive layer 5 are preferably glue, which is convenient for processing. In specific implementation, materials such as self-adhesive can also be used. It should be noted that, according to different applications, the first adhesive layer 3 and the second adhesive layer 5 can be made of different materials, for example, the first adhesive layer 3 is made of glue, and the second adhesive layer 5 is made of self-adhesive. At the same time, according to the usage, the first adhesive layer 3 and the second adhesive layer 5 may not be provided during production and processing. For example, other fixing structures are selected to fix the first circuit layer 4 and the first insulating layer 2 together, and fix the second insulating layer 6 and the first circuit layer 4 together. In this embodiment, the first insulating layer 2 and the second insulating layer 6 are made of polyimide film or polyester film, and other insulating materials can also be used without special requirements. It should be noted that, to control the thickness of the entire keyboard, the thickness of the first insulating layer 2 is 0.02 mm-0.05 mm, preferably 0.03 mm, which can meet the needs of use while ensuring the insulating effect. The thickness of the second insulating layer 6 can also be controlled at 0.02 mm-0.05 mm, which is consistent with the thickness of the first insulating layer 2.

In this embodiment, a composite film 11 is arranged above the light-guiding film 10, and has two functions of reflection and light shielding. The thickness of the composite film 11 is 0.020-0.30 mm, and the lower layer 1102 of the composite film 11 is provided with white ink for reflecting light. The upper layer 1101 of the composite film. 11 is provided with black ink for shading. The composite film 11 is not provided with white ink and black ink at the position corresponding to the keycap 13, or the composite film 11 is provided with an opening 1103 at the position corresponding to the keycap 13 to allow light to pass through.

In this embodiment, the support structure 1 is made of steel sheet, and the thickness of the steel sheet is 0.10 mm-0.25 sum. The preferred value is 0.15 mm, which can meet the strength requirements without making the overall circuit board too thick. The support structure 1 can also use other alloys, such as aluminum alloy materials, titanium alloy materials, etc., to meet the support strength of the keyboard.

In this embodiment, the elastic conducting member is made of an elastic sheet 14, which can also be called a Rubber Dome or a dome piece. In the specific implementation, a rubber or silicone button form can also be used, which mainly plays the role of elastic support and increased hand feeling. In the specific implementation, according to the implementation, the elastic sheet can be arranged on the trigger layer 9; or the elastic sheet can be arranged on the light-guiding film 10; The elastic sheet 1 is arranged on the composite film 11, preferably arranged on the trigger layer 9, and the use effect is the best.

In this embodiment, a scissor foot 12 is arranged between the keycap 13 and the elastic conducting member and the keycap 13 and the scissor foot 12 are respectively arranged on the support structure 1. In order to facilitate installation, the support structure is provided with installation holes, hooks, etc. for installation.

It should be understood that the application of the present disclosure is not limited to the above examples. For those of ordinary skill in the art, improvements or transformations can be made according to the above descriptions, and all these improvements and transformations should belong to the protection scope of the appended claims of the present application.

What is claimed is:

1. A light-emitting keyboard module with a metal base material flexible copper-clad double-sided circuit board, comprising a double-sided circuit board, a trigger layer, a light-guiding film, an elastic conducting member, an LED light and a keycap, wherein the trigger layer is arranged on the double-sided circuit board, and conducting contacts are arranged under the trigger layer corresponding to a position of the double-sided circuit board, a conduction pressing point is arranged at a position corresponding to the conducting contact above the trigger layer, the LED light is arranged on the double-sided circuit board and is arranged corresponding to the keycap, the trigger layer is provided with a first through hole at a position corresponding to the LED light, the light-guiding film is arranged above the trigger layer, the light-guiding film is provided with a second through hole at a position corresponding to the first through hole, and the LED light is arranged inside the first through hole and the second through hole, the light-guiding film is provided with a third through hole at a position corresponding to the conduction pressing point, the elastic conducting member is arranged at a position corresponding to the third through hole, and the keycap is arranged above the elastic conducting member.

2. The light-emitting keyboard module with a metal base material flexible copper-clad double-sided circuit board according to claim 1, wherein the double-sided circuit board comprises a support structure, a first insulating layer, a first circuit layer, a second insulating layer and a second circuit layer, wherein the first insulating layer is arranged on the support structure, the first circuit layer is arranged on the first insulating layer, and the second insulating layer is arranged on the first circuit layer, a fourth through hole is provided on the second insulating layer at a position corresponding to the first circuit layer, and the second circuit layer is arranged on the second insulating layer, the second circuit layer is connected to the first circuit layer through the fourth through hole.

3. The light-emitting keyboard module with a metal base material flexible copper-clad double-sided circuit board according to claim 2, wherein an extending portion is provided on the second circuit layer at a position corresponding to the fourth through hole, and the extending portion is placed inside the fourth through hole and is connected with the first circuit layer.

4. The light-emitting keyboard module with a metal base material flexible copper-clad double-sided circuit board according to claim 3, wherein the double-sided circuit board further comprises a protective layer, the protective layer is arranged on the second circuit layer, and a fifth through hole is provided on the protective layer at a position corresponding to the fourth through hole, and the extending portion is placed inside the fifth through hole.

5. The light-emitting keyboard module with a metal base material flexible copper-clad double-sided circuit board according to claim 2, wherein the first insulating layer is fixed with the first circuit layer by using a first adhesive layer, and a thickness of the first insulating layer is 0.02 mm-0.05 mm; the second insulating layer is fixed with the first circuit layer by using a second adhesive layer, a thickness of the second insulating layer is 0.02 mm-0.05 mm.

6. The light-emitting keyboard module with a metal base material flexible copper-clad double-sided circuit board according to claim 2, wherein the support structure is a steel sheet, and the thickness of the steel sheet is 0.10 mm-0.25 mm.

7. The light-emitting keyboard module with a metal base material flexible copper-clad double-sided circuit board according to claim 6, wherein a scissor foot is arranged between the keycap and the elastic conducting member, wherein the keycap and the scissor foot are respectively arranged on the support structure.

8. The light-emitting keyboard module with a metal base material flexible copper-clad double-sided circuit board according to claim 1, wherein a composite film is arranged above the light-guiding film, a thickness of the composite film is 0.020-0.30 mm, a lower layer of the composite film is provided with white ink, and an upper layer of the composite film is provided with black ink, wherein the composite film is not provided with white ink and black ink at a position corresponding to the keycap, or the composite film is provided with an opening at the position corresponding to the keycap.

9. The light-emitting keyboard module with a metal base material flexible copper-clad double-sided circuit board according to claim 8, wherein the elastic conducting member is an elastic sheet, and the elastic sheet is arranged on the trigger layer.

10. The light-emitting keyboard module with a metal base material flexible copper-clad double-sided circuit board according to claim 8, wherein the elastic conducting member is an elastic sheet, and the elastic sheet is arranged on the light-guiding film.

11. The light-emitting keyboard module with a metal base material flexible copper-clad double-sided circuit board according to claim 8, wherein the elastic conducting member is an elastic sheet, and the elastic sheet is arranged on the composite film.

12. The light-emitting keyboard module with a metal base material flexible copper-clad double-sided circuit board according to claim 1, wherein the conduction pressing point is a silver paste dot or carbon paste dot.

* * * * *